United States Patent
Schwartz et al.

(10) Patent No.: US 9,483,522 B2
(45) Date of Patent: Nov. 1, 2016

(54) FORM AGGREGATION BASED ON MARKS IN GRAPHIC FORM FIELDS

(71) Applicants: Edward L. Schwartz, Menlo Park, CA (US); John W. Barrus, Menlo Park, CA (US); Michael J. Gormish, Redwood City, CA (US)

(72) Inventors: Edward L. Schwartz, Menlo Park, CA (US); John W. Barrus, Menlo Park, CA (US); Michael J. Gormish, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 388 days.

(21) Appl. No.: 13/789,605

(22) Filed: Mar. 7, 2013

(65) Prior Publication Data
US 2014/0258331 A1  Sep. 11, 2014

(51) Int. Cl.
*G06F 17/30* (2006.01)

(52) U.S. Cl.
CPC ... *G06F 17/30392* (2013.01); *G06F 17/30277* (2013.01)

(58) Field of Classification Search
CPC .............................................. G06F 17/30277
See application file for complete search history.

(56) References Cited

U.S. PATENT DOCUMENTS

| | | | |
|---|---|---|---|
| 6,862,543 B1 | 3/2005 | Tanimoto et al. | |
| 2005/0034075 A1 | 2/2005 | Riegelman et al. | |
| 2005/0065959 A1* | 3/2005 | Smith et al. | 707/102 |
| 2006/0132291 A1 | 6/2006 | Dourney | |
| 2007/0106535 A1 | 5/2007 | Matsunaga | |
| 2009/0125487 A1* | 5/2009 | Rossi et al. | 707/3 |
| 2009/0210416 A1* | 8/2009 | Bennett | 707/5 |
| 2013/0006654 A1 | 1/2013 | Hermans | |

FOREIGN PATENT DOCUMENTS

EP  1684221  7/2006

OTHER PUBLICATIONS

Baxter, Mobile GIS Helps Fight Desert Dumping, Pen Computing Magazine, http://www.pencomputing.com/case_studies/case_studies_mapping.html, printed Feb. 12, 2014, 2 pages, Dona Ana County, New Mexico.

Scribble Maps, The Easiest Way to Draw and Share Maps, WayBack Machine, www.scribblemaps.com, dated 2009, 2 pages, Stairs Studio Inc.

Hoose, Digital Pen Stores Vital Fire GIS Data, Firefighter Nation.com Newsletters, http://www.firefighternation.com/article/technology/digital-pen-stores, dated Nov. 1, 2009, 3 pages, PennWell Corporation, Tulsa, OK.

(Continued)

*Primary Examiner* — Kris Mackes
(74) *Attorney, Agent, or Firm* — Patent Law Works LLP

(57) ABSTRACT

The disclosure includes a system and method for aggregating form data based on marks in graphic form fields. The system includes a controller, a request customization module, a search module and a presentation module. The controller receives data indicating an initiation of a search request from a user, data describing a form selected by the user, data describing a graphic form field specified by the user in the form and data describing a region of interest specified by the user in the graphic form field. The request customization module customizes the search request using the region of interest. The search module performs a form search on a collection of form data using the search request to determine one or more matching forms that each include at least one mark satisfying the region of interest. The presentation module provides the one or more matching forms to the user.

20 Claims, 14 Drawing Sheets

(56) References Cited

OTHER PUBLICATIONS

Trimble, Rugged and Reliable Data Collection, GeoExplorer 3000 Series GeoXT Handheld, WayBack Machine, www.trimble.com/geoxt3000.shtml, dated 2012, 2 pages, Trimble Navigation Limited.
Esri, Esri Climate Resilience App Challenge 2014, http://esri.com/partners/hardware/wacom, printed Apr. 15, 2014, 1 page.
Esri, Wacom-esri 480.mp4, http://media.esri.com/arcstream/2010/11/Wacom-esri_480.mp4, dated Jan. 24, 2014, printed Apr. 15, 2014, 1 page.
Esri, Esri Video, http://www.video.esri.com/watch/129/interactive-pen-display-for-gis-and-go, printed Apr. 15, 2014, 1 page.
Zillow, Find Home Search, http://www.zillow.com, printed Apr. 15, 2014, 1 page.

* cited by examiner

300

Name: _____ Date: _____

Have you have any of the following Childhood Illnesses (Check if yes)
Scarlet fever _____ Diphtheria _____ Rheumatic fever _____ Measles _____

Have you had any immunizations? Yes  No  Negative reactions? _____

Hospitalizations, Surgery, X-Ray and Special Studies
What hospitalizations, surgeries, x-rays, or special studies have you had?
_____ Year: _____   _____ Year: _____

Allergies
Are you hypersensitive or allergic to foods, drugs, or environmental substances?
Please list: _____

General
Weight _____ lbs.     Height _____     Weight 1 year ago ____ lbs.
Maximum (non pregnant) Weight _____ lbs.     When _____

Review of Symptons
Answer questions or check any of the following you have or have had in the past 6 months.

Please mark or shade in areas where you are experiencing pain on figures (if applicable).

Front   Back

Lifestyle habits
Main interests and hobbies? _____
____ Exercise, what kind? _____
How often do you exercise? _____

___Y___ N   Have a religious/spiritual practice
___Y___ N   Average 6-8 hrs. of sleep
___Y___ N   Have a supportive relationship
___Y___ N   History of abuse
___Y___ N   Major traumas
___Y___ N   Use recreational drugs

Matching Form 5

Matching Form 6

| Forms within each cluster: | | Forms ranked in each cluster: | |
|---|---|---|---|
| Cluster 1: | Form 1 (Mark 1)<br>Form 2 (Mark 2)<br>Form 5 (Mark 5) | Cluster 1: | Form 1 (Mark 1)<br>Form 5 (Mark 5)<br>Form 2 (Mark 2) |
| Cluster 2: | Form 3 (Mark 3)<br>Form 4 (Mark 4)<br>Form 6 (Mark 6) | Cluster 2: | Form 3 (Mark 3)<br>Form 6 (Mark 6)<br>Form 4 (Mark 4) |

FORM AGGREGATION BASED ON MARKS IN GRAPHIC FORM FIELDS

BACKGROUND OF THE INVENTION

1. Field of the Invention

The specification relates to a system and method for aggregating data. In particular, the specification relates to a system and method for aggregating form data that describes forms with graphic form fields.

2. Description of the Background Art

A form that allows a user to fill out information may include one or more text fields and one or more graphic form fields. A user can interact with the form displayed on a client device (e.g., a tablet) by drawing on a diagram in a graphic form field of the form using a finger or a stylus. These forms are helpful for tracking individual data, however, applications associated with the forms are limited in the information that they provide.

SUMMARY OF THE INVENTION

The disclosure includes a system and method for aggregating form data based on marks in graphic form fields. In one embodiment, the system includes: a controller configured to receive data indicating an initiation of a search request from a user, data describing a form selected by the user, data describing a graphic form field specified by the user in the form and data describing a region of interest specified by the user in the graphic form field; a request customization module configured to customize the search request using the region of interest in the graphic form field; a search module configured to perform a form search on a collection of form data using the search request to determine one or more matching forms that each include at least one mark satisfying the region of interest; and a presentation module configured to provide the one or more matching forms to the user.

Other aspects include corresponding methods, systems, apparatuses, and computer program products for these and other innovative aspects.

The system is particularly advantageous in numerous respects. First, the system is capable of aggregating form data based on marks drawn on a graphic form field, allowing a user to make business decisions using the aggregated form data. Second, the system allows a user to configure a search request so that the search request specifies one or more of a region of interest, a region of exclusion, a regional aggregation parameter and a marking property. The system generates a matching result that includes one or more matching forms satisfying one or more of the region of interest, the region of exclusion, the regional aggregation parameter and the marking property. Third, the system allows a user to organize the matching forms in the matching result according to a marking property (e.g., a marking length, a marking style, a marking contour, a marking location and a count of marks, etc.). The system may have other numerous advantages.

BRIEF DESCRIPTION OF THE DRAWINGS

The invention is illustrated by way of example, and not by way of limitation in the figures of the accompanying drawings in which like reference numerals are used to refer to similar elements.

FIG. 3A is a graphic representation of one embodiment of a form including one or more graphics.

DETAILED DESCRIPTION OF THE PREFERRED EMBODIMENTS

Figure 1:
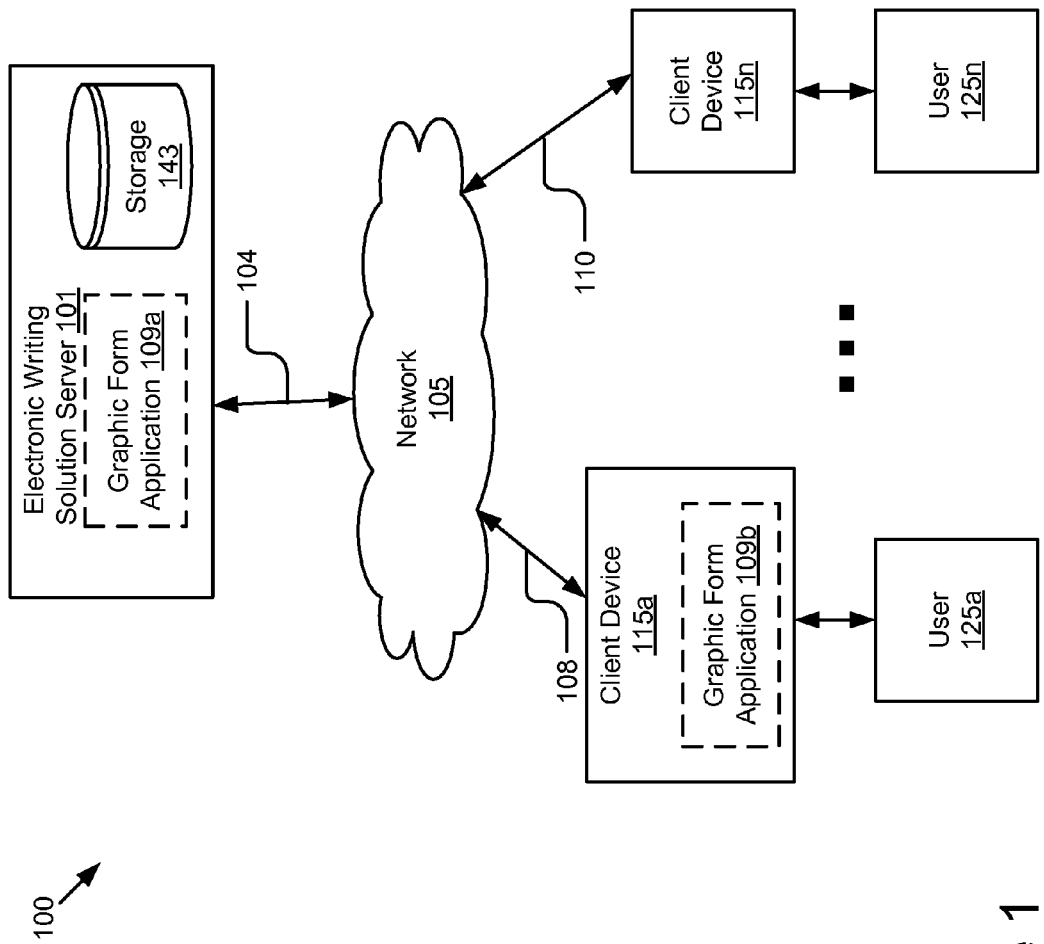
FIG. 1 is a high-level block diagram illustrating one embodiment of a system for aggregating form data based on marks in graphic form fields.

A system and method for aggregating form data based on marks in graphic form fields are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to client devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for aggregating form data based on marks in graphic form fields according to one embodiment. The illustrated system 100 includes client devices 115a . . . 115n that can be accessed by users 125a . . . 125n and an electronic writer solution server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated implementation, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the electronic writer solution server 101, in practice one or more networks 105 can be connected to these entities.

In one embodiment, the graphic form application 109a may be operable on the electronic writer solution server 101, which is coupled to the network 105 via signal line 104. The electronic writer solution server 101 can be a hardware server that includes a processor, a memory and network communication capabilities. In some implementations, the electronic writer solution server 101 sends and receives data to and from the client devices 115a, 115n via the network 105. While FIG. 1 includes one electronic writer solution server 101, the system 100 may include one or more electronic writer solution servers 101. The electronic writer solution server 101 also includes a storage device 143, which is described below in more detail with reference to FIG. 2.

In another embodiment, the graphic form application 109b may be stored on a client device 115a, which is connected to the network 105 via signal line 108. In some implementations, the client device 115a, 115n may be a computing device that includes a memory and a processor, for example a laptop computer, a desktop computer, a tablet computer, a mobile telephone, a personal digital assistant (PDA), a mobile email device or other electronic device capable of accessing a network 105. In the illustrated implementation, the user 125a interacts with the client device 115a. The client device 115n is communicatively coupled to the network 105 via signal line 110. The user 125n interacts with the client device 115n. In some implementations, the graphic form application 109b acts as a thin-client application that may be stored in part on the client device 115a, 115n and in part as components on the electronic writer solution server 101. For example, the electronic writer solution server 101 stores data describing one or more forms with marks noted by users in the storage device 143. The graphic form application 109b sends instructions to a display device, for example using a browser, for displaying the one or more forms to the user 125a on the client device 115a. The client devices 115a, 115n in FIG. 1 are used by way of example. While FIG. 1 illustrates two client devices 115a and 115n, the disclosure applies to a system architecture having one or more client devices 115.

The graphic form application 109 is code and routines for aggregating form data that describes one or more forms. In some implementations, the graphic form application 109 can be implemented using hardware including a field-programmable gate array (FPGA) or an application-specific integrated circuit (ASIC). In some other implementations, the graphic form application 109 can be implemented using a combination of hardware and software. In some implementations, the graphic form application 109 may be stored in a combination of the devices and servers, or in one of the devices or servers.

In one embodiment, the graphic form application 109 receives a search request from a user including a graphic form field and a region of interest specified by the user. The graphic form application 109 performs a form search on a collection of form data stored in the storage device 143 using the search request, and determines a matching result that satisfies the search request. A form search is a search conducted to obtain matching forms that satisfy a search request. A matching result is a search result that satisfies a search request. The matching result includes one or more matching forms satisfying the search request. The graphic form application 109 provides the matching result to the user. The graphic form application 109 is described below in more detail with reference to FIGS. 2 and 4-6C.

Graphic Form Application

Figure 2:
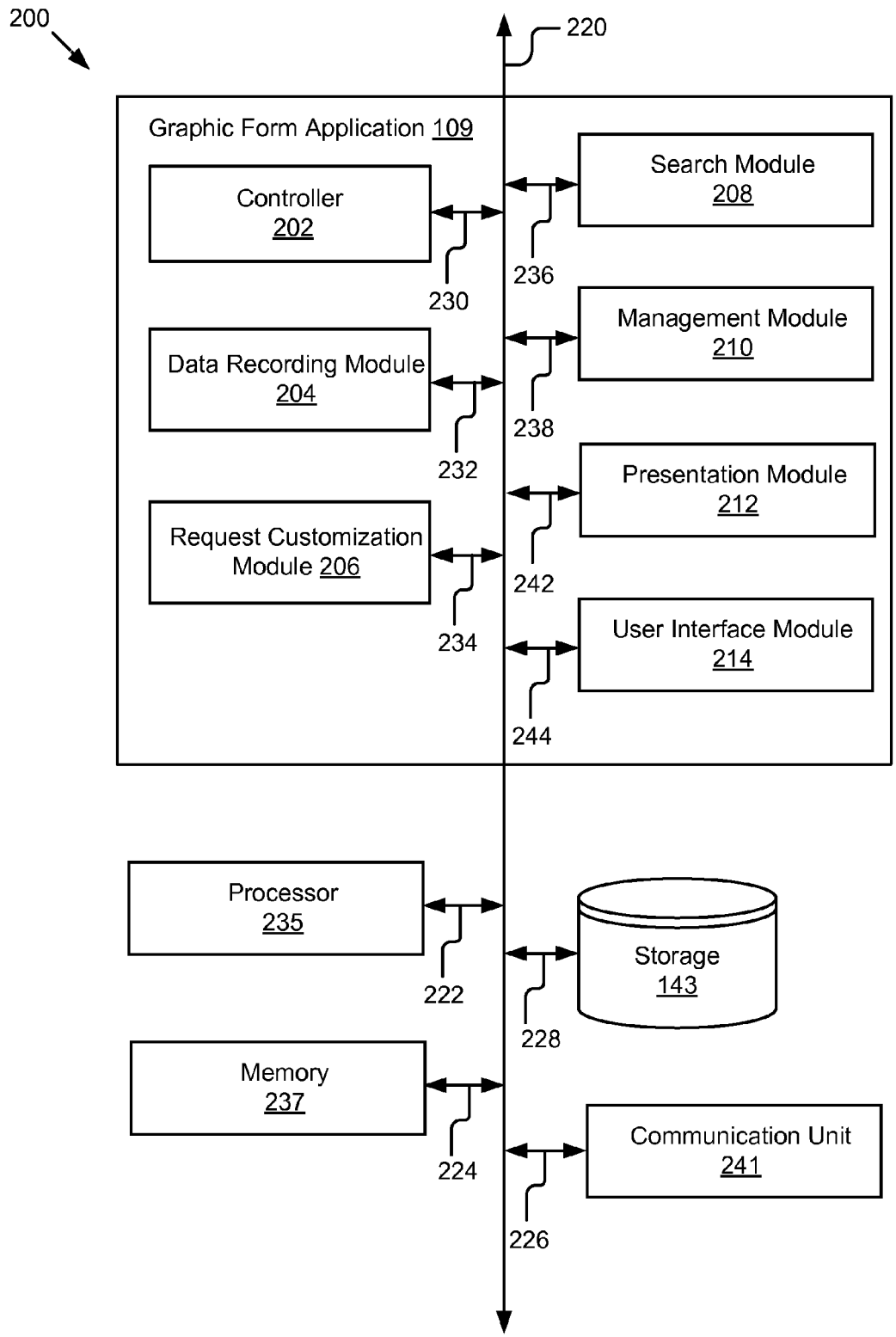
FIG. 2 is a block diagram illustrating one embodiment of a graphic form application.

Referring now to FIG. 2, an example of the graphic form application 109 is shown in more detail. FIG. 2 is a block diagram of a computing device 200 that includes a graphic form application 109, a processor 235, a memory 237 and a communication unit 241 according to some examples. In some implementations, the computing device 200 additionally includes a storage device 143. The components of the computing device 200 are communicatively coupled by a bus 220. In some implementations, the computing device 200 can be one of a client device 115 and a electronic writer solution server 101.

The processor 235 includes an arithmetic logic unit, a microprocessor, a general purpose controller or some other processor array to perform computations and to optionally provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that can be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 is hardware for receiving and transmitting data by linking the processor 235 to the network 104 and other processing systems. The communication unit 241 receives data such as user input for a form from client device 115 and transmits the data, for example, data describing one or more marks drawn in a graphic form field, to the data recording module 204. The communication unit 241 also transmits data to the client device 115, for example, a blank form or a form modified based on marks drawn. The communication unit 241 is coupled to the bus 220 via signal line 226.

In one embodiment, the communication unit 241 includes a port for direct physical connection to the client device 115 or to another communication channel. For example, the communication unit 241 includes an RJ45 port or similar port for wired communication with the client device 115. In another embodiment, the communication unit 241 includes a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 includes a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The storage device 143 can be a non-transitory memory that stores data for providing the functionality described herein. The storage device 143 may be a dynamic random access memory (DRAM) device, a static random access memory (SRAM) device, flash memory or some other memory devices. In some implementations, the storage device 143 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 143 is communicatively coupled to the bus 220 via signal line 228. In one embodiment, the storage device 143 stores one or more of form data describing one or more forms that include one or more graphic form fields, data describing one or more marks noted by users in a graphic form field of a form, data describing one or more regions of interest in a graphic form field, data describing one or more regions of exclusion in a graphic form field, data describing one or more regional aggregation parameters, data describing one or more marking properties and data describing one or more matching results for a search request, etc. In some embodiments, the storage device 143 may store other data for providing the functionality described herein.

In the illustrated embodiment shown in FIG. 2, the graphic form application 109 includes a controller 202, a data recording module 204, a request customization module 206, a search module 208, a management module 210, a presentation module 212 and a user interface module 214. The components of the graphic form application 109 are communicatively coupled via the bus 220.

The controller 202 can be software including routines for handling communications between the graphic form application 109 and other components of the computing device 200. In one embodiment, the controller 202 can be a set of instructions executable by the processor 235 to provide the functionality described below for handling communications between the graphic form application 109 and other components of the computing device 200. In another embodiment, the controller 202 can be stored in the memory 237 of the computing device 200 and can be accessible and executable by the processor 235. In either embodiment, the controller 202 can be adapted for cooperation and communication with the processor 235 and other components of the computing device 200 via signal line 230.

In one embodiment, the controller 202 sends and receives data, via the communication unit 241, to and from one or more of a client device 115 and a electronic writer solution server 101. For example, the controller 202 receives, via the communication unit 241, a search request from a client device 115 operated by a user and sends the search request to the request customization module 206. In another example, the controller 202 receives graphical data for providing a user interface to a user from the user interface module 214 and sends the graphical data to a client device 115, causing the client device 115 to present the user interface to the user.

In one embodiment, the controller 202 receives data from other components of the graphic form application 109 and stores the data in the storage device 143. For example, the controller 202 receives data describing one or more marks noted in a graphic form field of a form from the data recording module 204 and stores the data in the storage device 143. In another embodiment, the controller 202 retrieves data from the storage device 143 and sends the data to other components of the graphic form application 109. For example, the controller 202 retrieves data describing a marking property from the storage device 143 and sends the retrieved data to the management module 210.

The data recording module 204 can be software including routines for recording form data. In one embodiment, the data recording module 204 can be a set of instructions executable by the processor 235 to provide the functionality described below for recording form data. In another embodiment, the data recording module 204 can be stored in the memory 237 of the computing device 200 and can be accessible and executable by the processor 235. In either embodiment, the data recording module 204 can be adapted for cooperation and communication with the processor 235 and other components of the computing device 200 via signal line 232.

In one embodiment, the data recording module 204 instructs the user interface module 214 to generate graphical data for providing a user interface that depicts a form to a user. The user interface module 214 sends the graphical data to a client device 115 via the controller 202, causing the client device 115 to present the form to the user in the user interface. In some examples, a form is a document that includes one or more graphic form fields. In some other examples, a form also includes one or more text fields. A form can be a document having a single page or multiple pages. A graphic form field is a form component that includes a graphic. In some examples, a graphic form field also includes text describing the graphic and/or instructions on how to mark up the graphic. Examples of a graphic in a graphic form field include, but are not limited to, a diagram, a drawing, a sketch of an object or a body, a map and a photograph taken with known geometry. For example, the photograph is taken under controlled conditions so that the geometry in the photograph is known, or the geometry in the photograph is determined using image analysis. Other example graphics in graphic form fields are possible.

The data recording module 204 receives data describing one or more marks drawn by the user on a graphic of a graphic form field in the form from the client device 115. For example, the data recording module 204 receives data indicating that the user draws multiple strokes on a diagram included in the form. The data recording module 204 stores form data describing the form and the one or more noted marks in the storage device 143. Examples of a mark noted by a user on a graphic include, but are not limited to, a stroke, a shaded area, a dot, a cross mark, a circle, a check mark, a straight line, a curved line or any other mark with any other shape. The user can make the marks using a stylus or the user's finger. The marks can be input on a regular screen, a zoomed-in or otherwise manipulated screen. The marks can be copied from another form, selected from a menu, determined based on eye-movement, determined based on a gesture recognition system, or input using any other method familiar to those of ordinary skill in the art.

In one embodiment, the one or more marks noted on a graphic of a graphic form field indicate location data that describes symptom, damage, geographic or mark location. For example, the location data indicated by marks noted on a graphic represents one of a location for a medical symptom on a diagram of a body (e.g., a pain location), a damage location on a diagram or a picture of an inspected item, a geographic location on a map (e.g., a toxic dumping location, a location with oil resources, etc.) or a marked location on a photograph with a known geometry, etc. The location data can be aggregated across multiple forms and used to help a user to make business decisions as described below in more detail. In another embodiment, the one or more marks noted on a graphic also indicate description data that describes a symptom. For example, a circle marked on a car diagram may indicate a dent on the car, a line marked on the car diagram may indicate a scratch on the car and a cross marked on the windshield may indicate a window chip.

The request customization module 206 can be software including routines for customizing a search request for a user. In one embodiment, the request customization module 206 can be a set of instructions executable by the processor 235 to provide the functionality described below for customizing a search request for a user. In another embodiment, the request customization module 206 can be stored in the memory 237 of the computing device 200 and can be accessible and executable by the processor 235. In either embodiment, the request customization module 206 can be adapted for cooperation and communication with the processor 235 and other components of the computing device 200 via signal line 234.

In one embodiment, the request customization module 206 receives, via the controller 202, data indicating an initiation of a search request from a user. For example, the request customization module 206 receives data indicating that a user requests to perform a form search on a collection of form data stored in the storage device 143. The request customization module 206 instructs the user interface module 214 to generate graphical data for providing a user interface to the user which allows the user to configure the search request. For example, the user interface allows the user to select a form and/or one or more graphic form fields in the form to be searched on, causing the search module 208 described below to determine one or more matching forms with each matching form having at least one mark noted in at least one of the graphic form fields. A matching form is a form including one or more marks satisfying a search request.

In some implementations, the user interface allows the user to specify one or more regions of interest in a graphic form field of a form, causing the search module 208 to determine one or more matching forms with each matching form having one or more marks satisfying at least one of the regions of interest (e.g., each matching form having a mark in at least one of the regions of interest). A region of interest is data describing a location area that a user is interested in. For example, a region of interest describes a location area on a graphic so that the matching forms determined by the search module 208 include marks noted in the location area. Examples of a region of interest include, but are not limited to, a location of a medical symptom (e.g., a pain location) on a diagram illustrating a body or part of a body, a damage location on a diagram or picture of an inspected item, a geographic location on a map and a marked location on a photograph taken with a known geometry. Other example regions of interest are possible.

The region of interest can be any shape, for example a circle with a point and a diameter. In one embodiment, a region of interest is a rectangular shape that includes a width, a height and one or more reference points for the region (e.g., a center point, one or more corner points for the region). A reference point is specified by a first coordinate value (e.g., a value in the $\vec{x}$ coordinate) and a second coordinate value (e.g., a value in the $\vec{y}$ coordinate).

In some implementations, the user interface allows the user to specify one or more regions of exclusion in a graphic form field of a form, causing the search module 208 (1) to determine one or more matching forms with each matching form having no marks in any of the regions of exclusion; or (2) to exclude forms where marks exist in the region of the exclusion. A region of exclusion is data describing a location area that a user is not interested in. For example, a region of exclusion indicates a location area on a graphic so that the matching forms determined by the search module 208 do not include any marks noted in the location area. In other words, marks noted in a region of exclusion are excluded in the matching result determined by the search module 208. In a further example, assume a user intends to obtain a search result that focuses on head pain, such as a headache. A region of interest for conducting the search is the head area and regions of exclusion for conducting the search include the rest of the body. The region of exclusion can be any shape, for example a circle with a point and a diameter. In one embodiment, a region of exclusion is a rectangular shape that includes a width, a height and one or more reference points for the region (e.g., a center point, one or more corner points for the region).

In some implementations, the user interface allows the user to specify a regional aggregation parameter for each region of interest, causing the search module 208 to determine one or more matching forms with each matching form having one or more marks satisfying the regional aggregation parameter. A regional aggregation parameter is data describing one or more criteria for aggregating marks in a region. For example, a regional aggregation parameter for a region indicates one or more of the following: (1) each matching form includes at least one mark in the region; (2) each matching form does not include any marks in the region; (3) marks in the region are completely contained within the region; (4) marks in the region can be partially overlapping with another region; (5) matching forms with marks found in the region are not ranked in the matching result; and (6) matching forms with marks found in the region are ranked in the matching result, etc. Other example regional aggregation parameters are possible.

In some implementations, the user interface allows the user to specify a marking property, causing the search module 208 to determine one or more matching forms with each matching form having one or more marks satisfying the marking property. A marking property is data describing a property of a mark. For example, a marking property includes one of a marking location where a mark is noted by a user, a marking style describing a style of a mark (e.g., a stroke, a circle, a cross, a straight line, a curved line, a broken line, a shaded area, etc.), a marking length (e.g., a stroke length, a circumference of a circle mark, etc.), a marking contour (e.g., a closed stroke, an open-ended stroke, etc.) and a number of marks in a region (e.g., a number of strokes), etc. Other example marking properties are possible.

In one embodiment, the request customization module 206 receives data describing one or more of a graphic form field in a form, one or more regions of interest, one or more regions of exclusion, one or more regional aggregation parameters and one or more marking properties specified by the user via the user interface. The request customization module 206 customizes the search request for the user based on the received data. For example, the request customization module 206 configures the search request to include one or more of the graphic form field in the form, the one or more regions of interest, the one or more regions of exclusion, the one or more regional aggregation parameters and the one or more marking properties specified by the user.

In one embodiment, the request customization module 206 generates a web service query based on the search request. In some examples, the graphic form application 109 implements the functionality described herein as web services. The request customization module 206 converts the search request to a web service query (e.g., a web service application programming interface (API) function) in order to obtain a matching result that satisfies the web service query from the web services.

In some examples, the web service API function includes one or more of the following parameters: a collection parameter identifying a collection of documents (e.g., a collection of form data) to be searched upon; a page parameter identifying a document page that includes a graphic form field; a field parameter identifying the graphic form field; a first coordinate value for a region of interest that indicates a distance of the region of interest relative to a first coordinate of the graphic form field (e.g., a left coordinate of the region of interest relative to the left coordinate of the graphic form field); a second coordinate value for the region of interest indicating a distance of the region of interest relative to a second coordinate of the graphic form field (e.g., a top coordinate of the region of interest relative to the top coordinate of the graphic form field); a width of the region of interest; a height of the region of interest; various document identifiers identifying the documents or the forms; and a marking parameter identifying a marking property (e.g. a style of a mark, a marking length, a marking contour and a number of marks in a region).

In one embodiment, the request customization module 206 sends the search request or the web service query to the search module 208. In another embodiment, the request customization module 206 stores the search request or the web service query in the storage device 143.

The search module 208 can be software including routines for performing a form search. In one embodiment, the search module 208 can be a set of instructions executable by the processor 235 to provide the functionality described below for performing a form search. In another embodiment, the search module 208 can be stored in the memory 237 of the computing device 200 and can be accessible and executable by the processor 235. In either embodiment, the search module 208 can be adapted for cooperation and communication with the processor 235 and other components of the computing device 200 via signal line 236.

In one embodiment, the search module 208 receives a search request or a web service query from the request customization module 206. The search module 208 performs a form search on a collection of form data stored in a storage device (e.g., the storage device 143) using the search request or the web service query. The search module 208 determines a matching result that includes one or more matching forms with each matching form satisfying the search request or the web service query. For example, each of the determined matching forms includes one or more marks satisfying one or more of: (1) the region of interest; (2) the region of exclusion; (3) the regional aggregation parameter; and (4) the marking property specified by the search request. For example, each matching form includes one or more marks which are located in the region of interest and not located in the region of exclusion; the one or more marks satisfy a regional aggregation parameter to be completely contained in the region of interest and not overlapping with other regions; and the one or more marks also satisfy a marking property to have a marking contour as an open-ended stroke.

In one embodiment, the search request describes a marked form including a graphic form field noted with one or more marks in a region of interest. The search module 208 determines one or more matching forms that match the marked form. For example, the search module 208 determines one or more matching forms that include similar marks noted in the same region of interest of the same graphic form field as the marked form. In another embodiment, the search request describes two or more marked forms each including graphic form fields noted by one or more marks in one or more regions of interest. The search module 208 determines one or more matching forms that share similar marks as a first marked form and that optionally do not have similar marks as a second marked form.

The search module 208 retrieves data describing the one or more matching forms from a storage device (e.g., the storage device 143) and sends the data to one or more of the management module 210 and the presentation module 212.

The management module 210 can be software including routines for managing a matching result that satisfies a search request. In one embodiment, the management module 210 can be a set of instructions executable by the processor 235 to provide the functionality described below for managing a matching result that satisfies a search request. In another embodiment, the management module 210 can be stored in the memory 237 of the computing device 200 and can be accessible and executable by the processor 235. In either embodiment, the management module 210 can be adapted for cooperation and communication with the processor 235 and other components of the computing device 200 via signal line 238.

In one embodiment, the management module 210 receives one or more matching forms from the search module 208. The management module 210 determines one or more marking properties associated with marks in the matching forms and organizes the one or more matching forms based on the one or more marking properties. For example, the management module 210 determines a number of marks in each matching form and ranks the one or more matching forms according to the number of marks in each matching form. In another example, the management module 210 determines a marking length for each mark in each matching form, and ranks the matching forms according the maximal marking length of the marks in each matching form. In one embodiment, the marking properties used to organize the matching forms are configured by a user.

In some implementations, the management module 210 determines a marking style for each mark in each matching form and organizes the matching forms based on the marking style. For example, in an automobile inspection form, a mark with a closed contour (e.g., a circle mark) may indicate a dent in an automobile and a mark noted as a cross "X" may indicate a window chip in the windshield. The management module 210 filters the matching forms according to the different marking styles of the different marks, and generates a first list of matching forms with closed contour marks indicating dents in automobiles and a second list of matching forms with cross marks indicating window chips in automobiles. Optionally, the management module 210 also ranks the matching forms in each list according to another marking property. For example, the management module 210 ranks the matching forms in each list according to the number of marks in each matching form.

In some implementations, the management module 210 determines a marking location for each mark in each matching form. For example, the management module 210 determines a bounding box (e.g., a rectangular box, a square box, a circle, etc.) that encloses a mark. The management module 210 determines a marking location for the mark as a midpoint within the bounding box (e.g., the center of the bounding box). The management module 210 records the marking location for the mark using a first coordinate value and a second coordinate value (e.g., a first value in a first coordinate $\vec{x}$ and a second value in a second coordinate $\vec{y}$).

The management module 210 determines a number of clusters that the matching forms are classified into. For example, the management module 210 determines the number of clusters based on the square root of half of the number of matching forms $$\left( \sqrt{\frac{\text{the number of matching forms}}{2}} \right).$$

In another example, the management module 210 determines the number of clusters using Akaike information criterion which is a measure of the relative goodness of fit of a statistical model and describes how the statistical model fits a set of observations. In yet another example, a user can specify the number of clusters for the management module 210.

The management module 210 organizes the matching forms into the clusters based on the marking locations of the marks. For example, the management module 210 filters each matching form into a cluster if a marking location of a mark in the matching form is within the range of the cluster. In one embodiment, the management module 210 filters each matching form into a single cluster. In another embodiment, the management module 210 filters a matching form into two or more clusters if a first mark in the matching form has a marking location within the range of a first cluster and a second mark in the matching form has a marking location within the range of a second cluster.

Optionally, the management module 210 determines a clustering location for each cluster and arranges the one or more clusters based on the clustering locations of the one or more clusters. For example, the management module 210 determines a clustering location for each cluster as a center point of the cluster and records the clustering location using a first coordinate value and a second coordinate value (e.g., a first value in a first coordinate $\vec{x}$ and a second value in a second coordinate $\vec{y}$). The management module 210 ranks the one or more clusters by sorting the clustering locations of the clusters based on the first coordinate value (e.g., the x value) and/or the second coordinate value (e.g., they value).

Optionally, the management module 210 also organizes the matching forms in each cluster according to a marking location of a mark in each matching form. For example, the management module 210 ranks the matching forms in each cluster by sorting a marking location of a mark in a corresponding matching form based on the first coordinate value (e.g., the x value) and/or the second coordinate value (e.g., they value). An example clustering process to organize matching forms is illustrated in FIG. 3I.

In one embodiment, the management module 210 sends data describing the organized matching forms (e.g., the ranked matching forms, the filtered matching forms, etc.) to the presentation module 212. In another embodiment, the management module 210 stores the data describing the organized matching forms in the storage device 143.

The presentation module 212 can be software including routines for providing a matching result. In one embodiment, the presentation module 212 can be a set of instructions executable by the processor 235 to provide the functionality described below for providing a matching result. In another embodiment, the presentation module 212 can be stored in the memory 237 of the computing device 200 and can be accessible and executable by the processor 235. In either embodiment, the presentation module 212 can be adapted for cooperation and communication with the processor 235 and other components of the computing device 200 via signal line 242.

In one embodiment, the presentation module 212 receives a matching result including one or more matching forms from the search module 208 and provides the matching result to an electronic writer solution server 101 or a client device 115. For example, the presentation module 212 provides the matching result to the electronic writer solution server 101 in a machine-readable format so that the electronic writer solution server 101 can process the matching result. In another example, the presentation module 212 instructs the user interface module 214 to generate graphical data for providing a user interface that depicts the matching result to a user. The user interface module 214 sends the graphical data to the client device 115, causing the client device 115 to present the matching result to the user via the user interface. For example, the user interface presented to the user depicts content in the matching forms, a table view with each matching form organized in a row of a table or a summary for the matching result, etc.

In another embodiment, the presentation module 212 receives one or more organized matching forms (e.g., the ranked or filtered matching forms) from the management module 210 and provides the one or more organized matching forms to the electronic writer solution server 101 or the client device 115. For example, the presentation module 212 instructs the user interface module 213 to generate graphical data for providing a user interface that depicts the one or more organized matching forms to a user. In some examples, the user interface allows the user to order the matching forms according to different marking properties including a marking length, a number of marks or a marking style, etc.

In one embodiment, the presentation of the matching result includes presenting one or more of content in the matching forms (e.g., content included in part of or all the pages in a matching form), a count of matching forms, part of or all of the fields in the matching forms, text data or symbolic data from the matching forms and metadata associated with the matching forms (e.g., data filled in the matching forms by users), etc. In other embodiments, the presentation of the matching result may include presenting other data associated with a form search to a user. In some implementations, the presentation module 212 presents the matching result to a user via a user interface depicting the matching result. In some other implementations, the presentation module 212 provides the matching result to a user by storing a copy of the matching result in the client device 115.

The user interface module 214 can be software including routines for generating graphical data for providing a user interface. In one embodiment, the user interface module 214 can be a set of instructions executable by the processor 235 to provide the functionality described below for generating graphical data for providing a user interface. In another embodiment, the user interface module 214 can be stored in the memory 237 of the computing device 200 and can be accessible and executable by the processor 235. In either embodiment, the user interface module 214 can be adapted for cooperation and communication with the processor 235 and other components of the computing device 200 via signal line 244.

In one embodiment, the user interface module 214 generates graphical data for providing a user interface to a user. The user interface module 214 sends the graphical data to a client device 115, causing the client device 115 to present the user interface to the user. For example, the user interface module 214 generates graphical data for providing a user interface that depicts a form. The user interface module 214 sends the graphical data to the client device 115, causing the client device 115 to present the form to a user via the user interface. In another example, the user interface module 214 generates graphical data for providing a user interface that depicts one or more matching forms to a user. In other embodiments, the user interface module 214 may generate graphical data for providing other user interfaces to users.

As an example use of the system described herein, the graphic form application 109 can search, aggregate and analyze location data noted by marks on diagrams that are collected from various client devices 115. For example, a user can draw one or more strokes on a graphic in a graphic form field displayed on the client device 115, where the one or more strokes noted by the user indicate one or more locations in the graphic. The graphic form application 109 aggregates the collected location data so that a user can make business decisions based on the aggregated location data. For example, the user specifies in a car form query that the user wants to see results where cars have scratches on the front and back bumpers without similar scratches on the body near the bumpers. The graphic form application 109 searches for all the forms that include marks noted on a car diagram representing scratches at the front and back bumpers without similar scratches on the body near the bumpers. The graphic form application 109 aggregates and presents all the matching forms to a user. Because the search results will include a time that the scratches occurred on a variety of cars, the user is able to identify the cause of the problem as improper use of a fixture while shipping the cars. The user can take action to prevent similar damages in the future by educating workers to use the shipping fixture correctly.

In another example, the graphic form application 109 records and aggregates location data marked by various users on a map and generates an oil-exploration map including all the marks that indicate locations with potential oil resources. In yet another example, the graphic form application 109 records and aggregates location data marked by users and generates a dumping map including all the marks that indicate locations with toxic dumping.

In yet another example, an employee from a rental car company marks a first set of scratches or dents on a car diagram displayed on a client device 115 before a customer checks out the rental car. When the customer returns the rental car, the employee marks a second set of scratches or dents on a similar car diagram displayed on the client device 115. The graphic form application 109 compares the first set of marks to the second set of marks and determines whether additional scratches or dents are caused by the customer. Optionally, the graphic form application 109 may also search a collection of form data stored in the storage device 143 using the marked car diagram to obtain data describing all the customers that have rented this car. Additional example use of the graphic form application 109 is illustrated with reference to FIGS. 3A-3H.

Graphic Representations

FIG. 3A is a graphic representation 300 of one embodiment of a form including one or more graphics. In the illustrated embodiment, the example form includes a graphic form field 302 with a first graphic illustrating a front of a body and a second graphic illustrating a back of the body. A user can mark or shade any area in the graphics to indicate a pain location on the body.

Figure 3B:
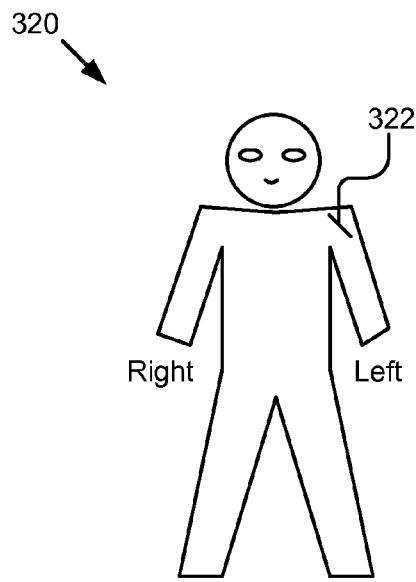
FIGS. 3B-3D are graphic representations of various embodiments of a search request that includes a graphic.
Figure 3C:
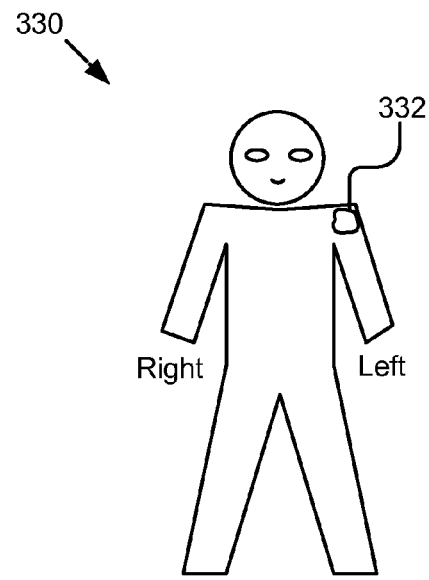
Figure 3D:
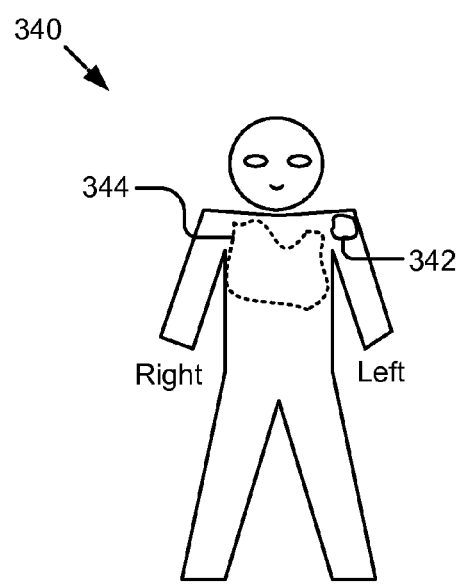

FIGS. 3B-3D are graphic representations 320, 330, 340 of various embodiments of a search request that includes a graphic in a graphic form field. Referring to FIG. 3B, the example graphic form field includes a graphic with a mark 322. The example search request indicates to search for forms that have marks similar to the mark 322. Referring to FIG. 3C, the example graphic form field includes a graphic with a mark 332. The mark 332 indicates a region of interest. The example search request indicates to search for forms that have marks in the region of interest illustrated by the mark 332. Referring to FIG. 3D, the example graphic form field includes a graphic with a first mark 342 and a second mark 344. The first mark 342 indicates a region of interest and the second mark 344 indicates a region of exclusion. The example search request indicates to search for forms that include marks in the region of interest, where the marks can be partially overlapped with regions adjacent to the region of interest. The example search request also indicates all the marks within the region of exclusion including those overlapping with the region of exclusion that are excluded from the matching result.

Figure 3E:
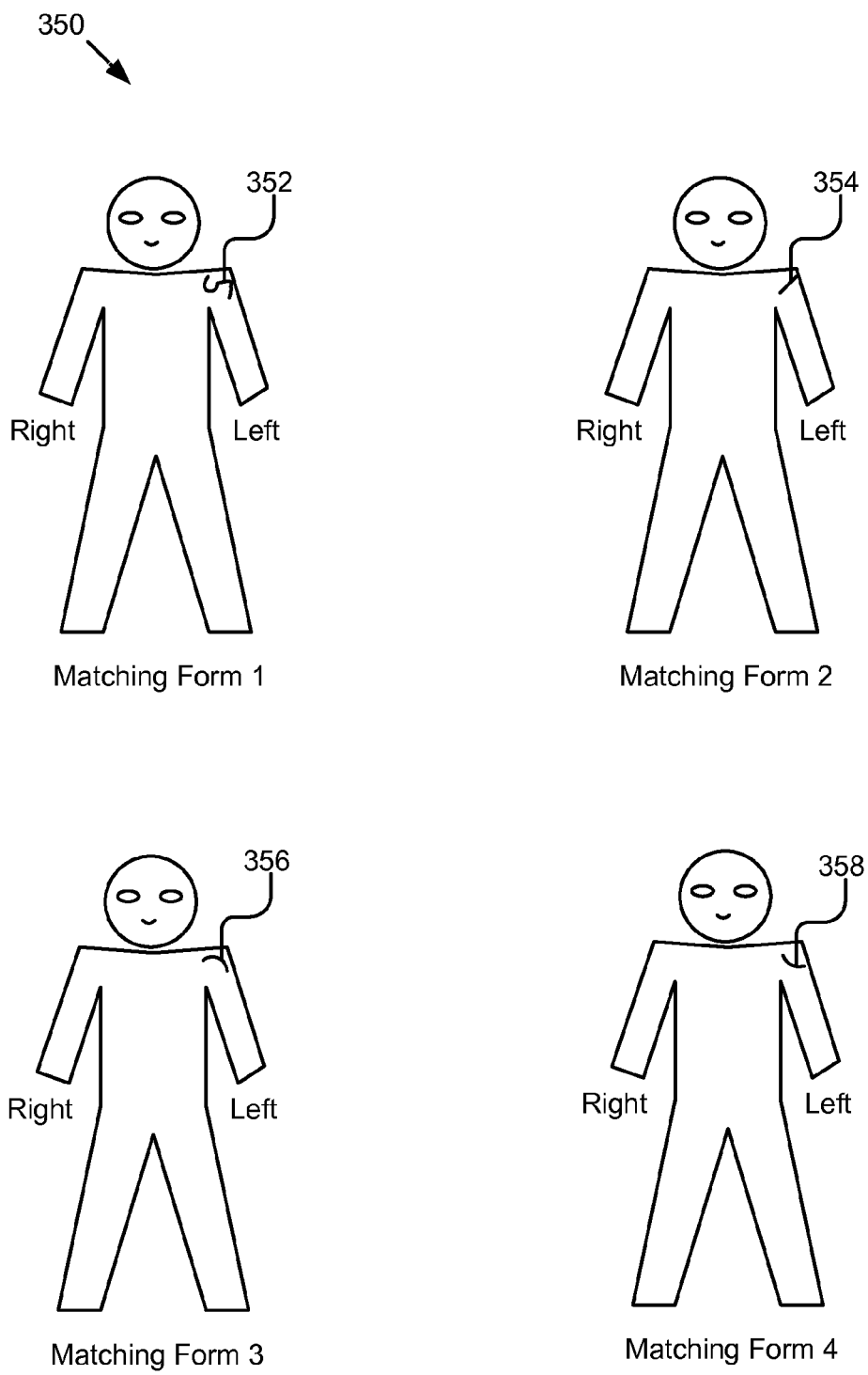
FIG. 3E is a graphic representation of one embodiment of various graphics in matching forms that match a search request.

FIG. 3E is a graphic representation 350 of one embodiment of various graphics in matching forms. FIG. 3E illustrates a first graphic in Matching Form 1 with a mark 352, a second graphic in Matching Form 2 with a mark 354, a third graphic in Matching Form 3 with a mark 356 and a fourth graphic in Matching Form 4 with a mark 358. The marks 352, 354, 356 and 358 satisfy the search request illustrated in FIGS. 3B-3D.

Figure 3F:
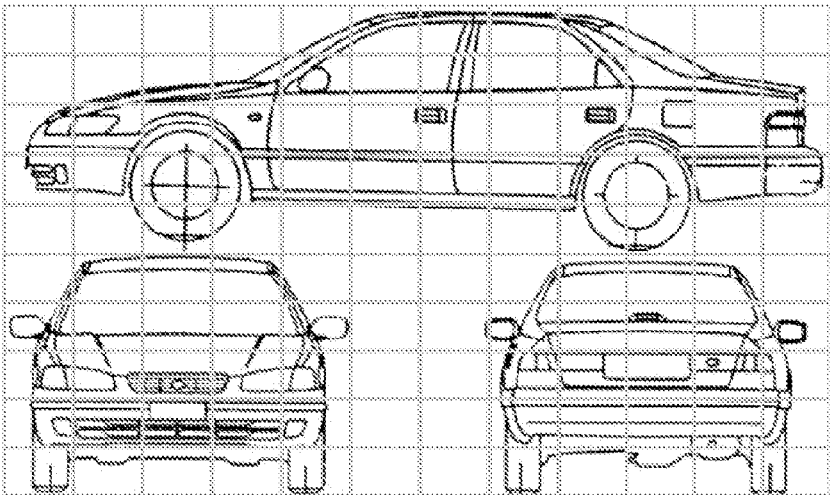
FIG. 3F is a graphic representation of another embodiment of a form including one or more graphics.

FIG. 3F is a graphic representation 360 of another embodiment of a form including graphics. A user can mark or shade any area in the graphics to indicate a damage location in a car.

Figure 3G:
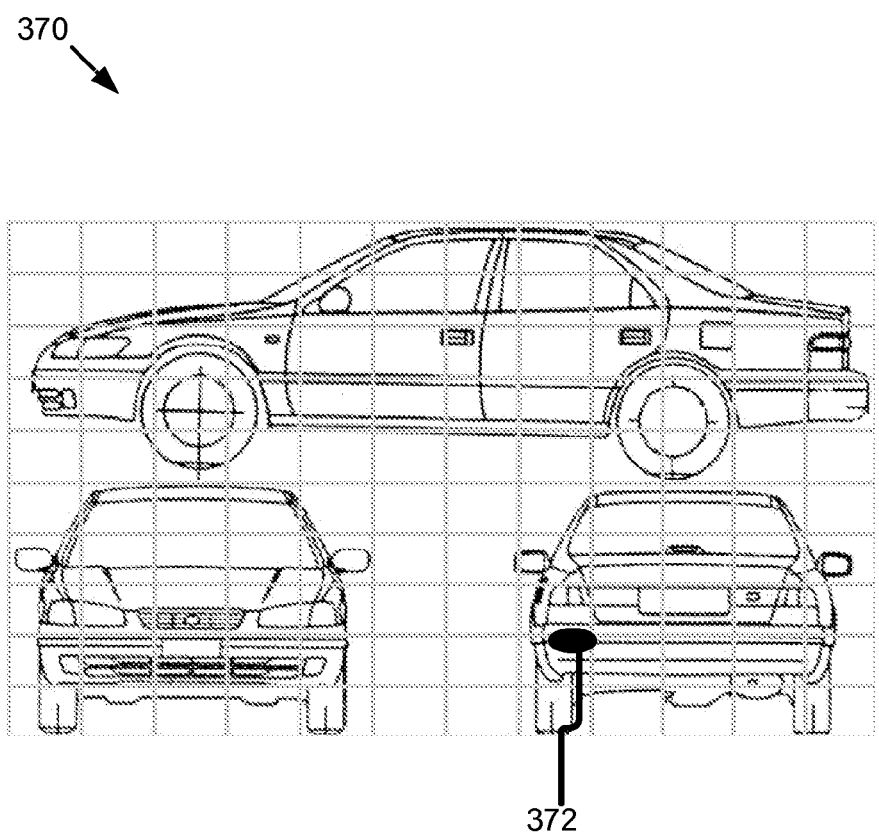
FIG. 3G is a graphic representation of another embodiment of a search request that includes a graphic.

FIG. 3G is a graphic representation 370 of another embodiment of a search request that includes a graphic form field. The example graphic form field includes graphics with a mark 372 in the back bumper of a car, indicating a dent in the back bumper. The example search request indicates to search for forms that have marks similar to the mark 372. For example, the example search request indicates to search for forms that have marks indicating dents in the back bumpers of cars.

Figure 3H:
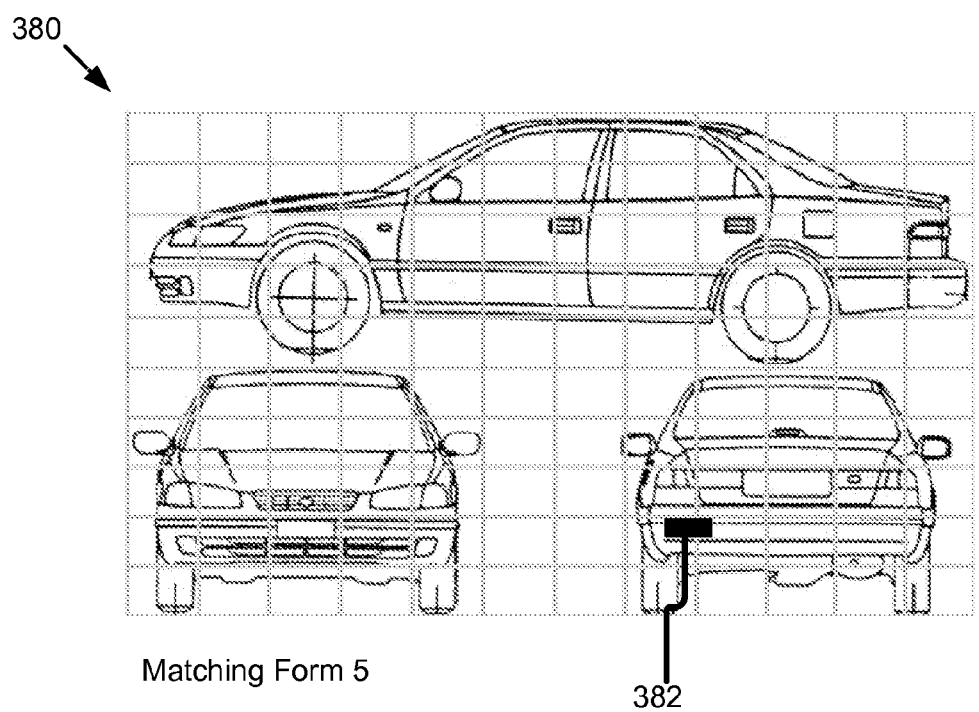
FIG. 3H is a graphic representation of another embodiment of various graphics in matching forms that match a search request.
Figure 3H:
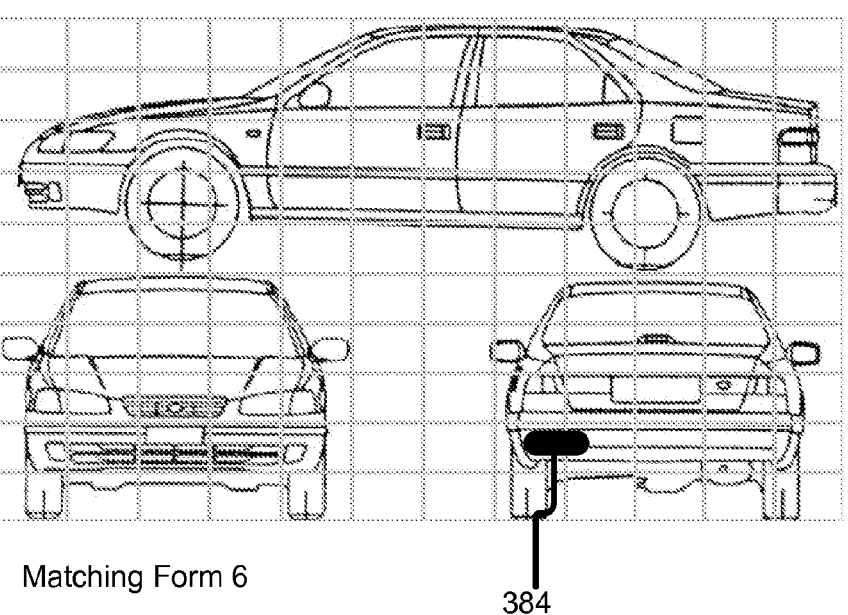
Figure 3I:
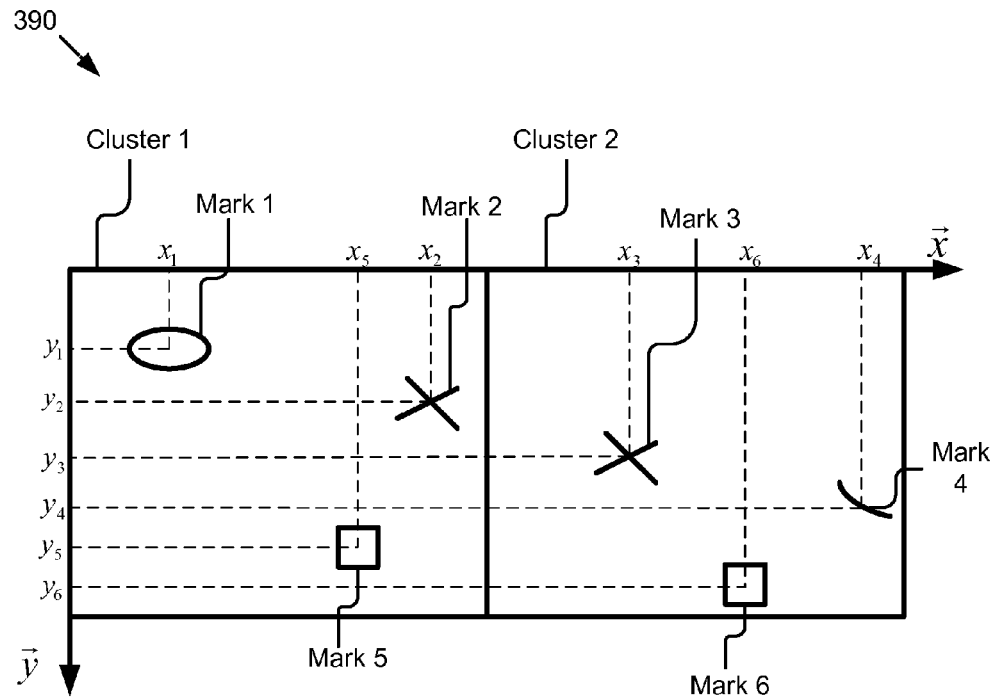
FIG. 3I is a graphic representation of one embodiment of one or more clusters of matching forms.

FIG. 3H is a graphic representation 380 of another embodiment of various graphics in matching forms that match a search request. FIG. 3H illustrates graphics in Matching Form 5 with a mark 382 and graphics in Matching Form 6 with a mark 384, where the marks 382 and 384 match a search request illustrated in FIG. 3G and indicate a dent in the back bumper of a car.

FIG. 3I is a graphic representation 390 of one embodiment of one or more clusters including matching forms. In the illustrated embodiment, Form 1 has a mark noted as Mark 1 with a marking location $(x_1, y_1)$, Form 2 has a mark noted as Mark 2 with a marking location $(x_2, y_2)$, Form 3 has a mark noted as Mark 3 with a marking location $(x_3, y_3)$, Form 4 has a mark noted as Mark 4 with a marking location $(x_4, y_4)$, Form 5 has a mark noted as Mark 5 with a marking location $(x_5, y_5)$ and Form 6 has a mark noted as Mark 6 with a marking location $(x_6, y_6)$. The management module 210 organizes Form 1, Form 2 and Form 5 into Cluster 1 because their marking locations are within the range of Cluster 1. The management module 210 organizes Form 3, Form 4 and Form 6 into Cluster 2 because their marking locations are within the range of Cluster 2.

In some examples, the management module 210 ranks the forms in Cluster 1 in the order of Form 1, Form 5 and Form 2 according to the first coordinate values in the marking locations (e.g., $x_1 < x_5 < x_2$). Similarly, the management module 210 ranks the forms in Cluster 2 in the order of Form 3, Form 6 and Form 4 according to the first coordinate values in the marking locations (e.g., $x_3 < x_6 < x_4$). In some other examples, the management module 210 ranks the forms in Cluster 1 in the order of Form 1, Form 2 and Form 5 according to the second coordinate values in the marking locations (e.g., $y_1 < y_2 < y_5$). Similarly, the management module 210 ranks the forms in Cluster 2 in the order of Form 3, Form 4 and Form 6 according to the second coordinate values in the marking locations (e.g., $y_3 < y_4 < y_6$).

Methods

Figure 4:
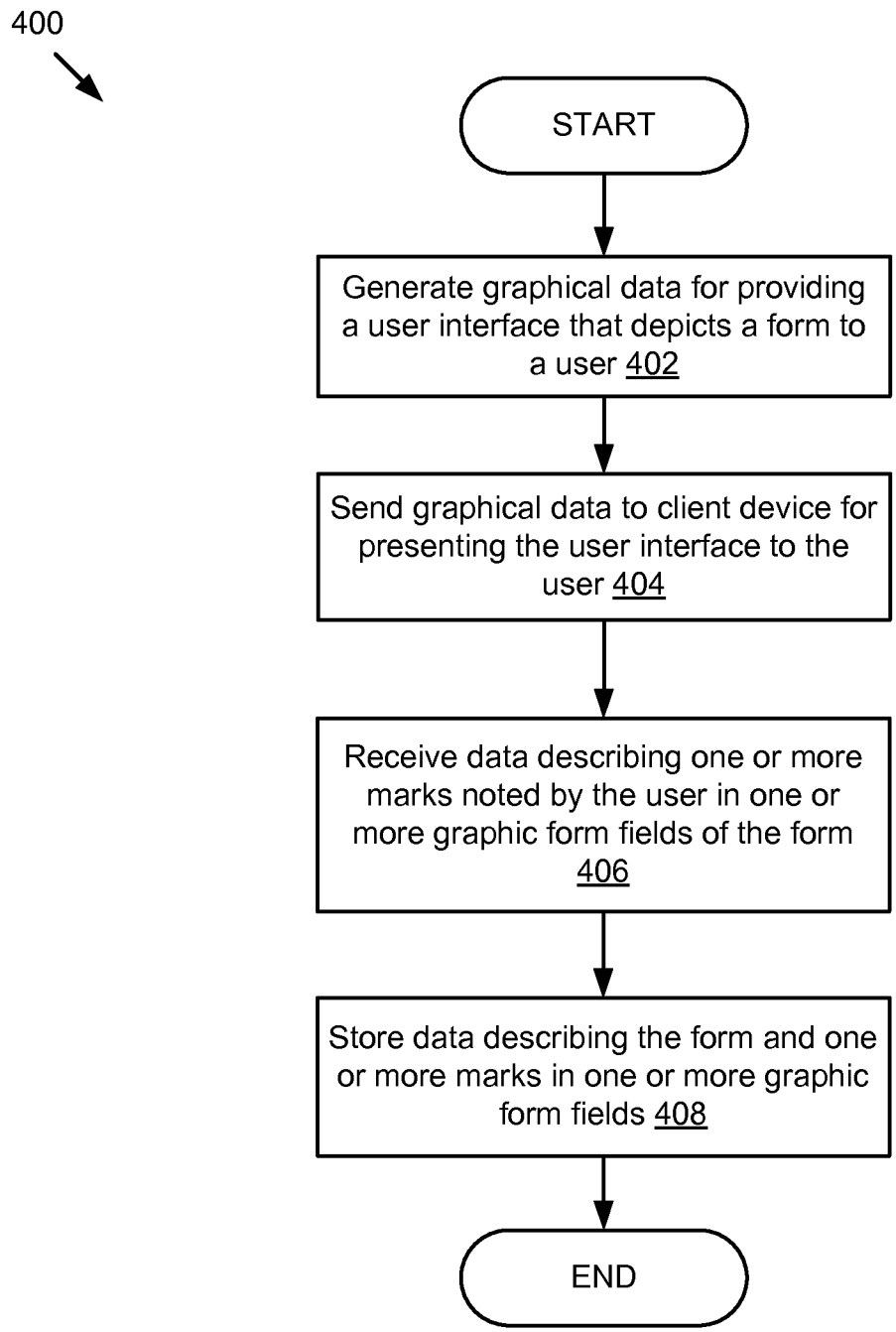
FIG. 4 is a flow diagram of one embodiment of a method for recording form data that describes forms with graphic form fields.

FIG. 4 is a flow diagram of one embodiment of a method 400 for recording form data that describes forms with graphic form fields. The graphic form application 109 comprises a controller 202, a data recording module 204 and a user interface module 214. In some implementations, the data recording module 204 instructs the user interface module 214 to generate 402 graphical data for providing a user interface that depicts a form to a user. The controller 202 sends 404 the graphical data to a client device 115 for presenting the user interface to the user. The controller 202 receives 406 data describing one or more marks noted by the user in one or more graphic form fields of the form from the user. The data recording module 204 stores 408 the data describing the form and the one or more marks noted in the one or more graphic form fields in the storage device 143.

Figure 5:
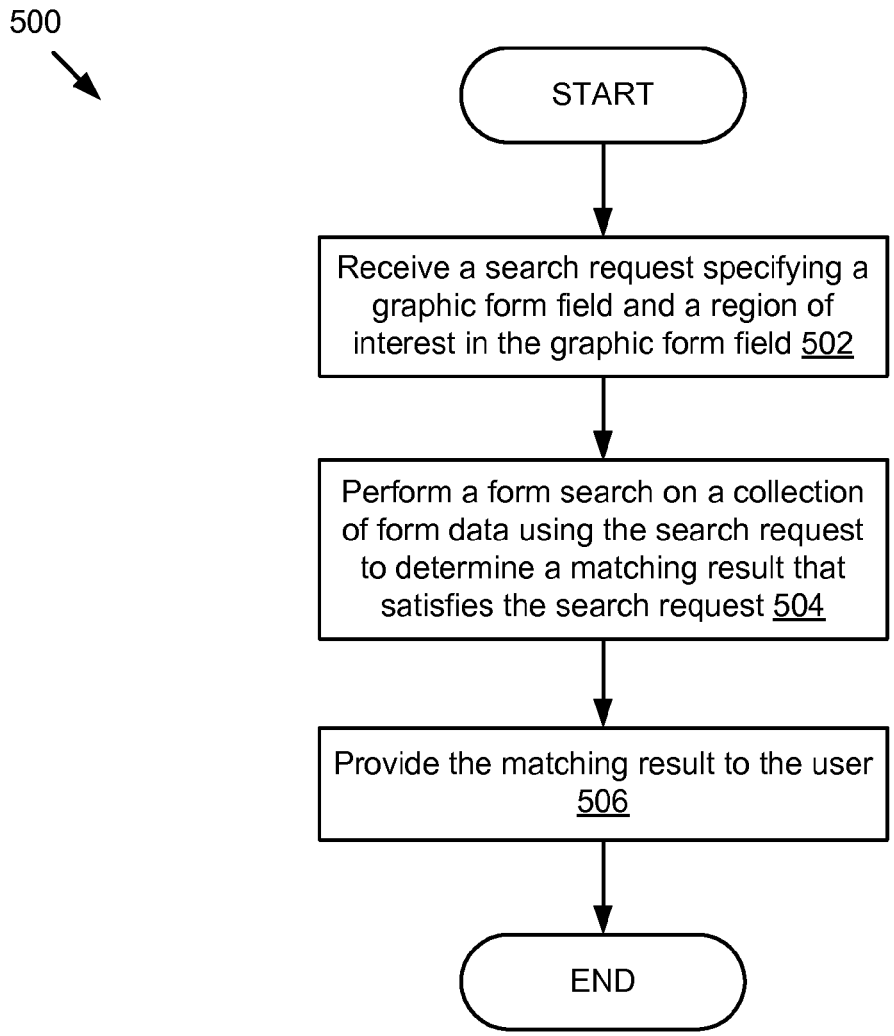
FIG. 5 is a flow diagram of one embodiment of a method for aggregating form data based on marks in graphic form fields.

FIG. 5 is a flow diagram of one embodiment of a method 500 for aggregating form data based on marks in graphic form fields. The graphic form application 109 includes a controller 202, a search module 208 and a presentation module 212. The controller 202 receives 502 a search request specifying a graphic form field and a region of interest in the graphic form field from a user. The search module 208 performs 504 a form search on a collection of form data using the search request to determine a matching result that satisfies the search request. The presentation module 212 provides 506 the matching result to the user.

Figure 6A:
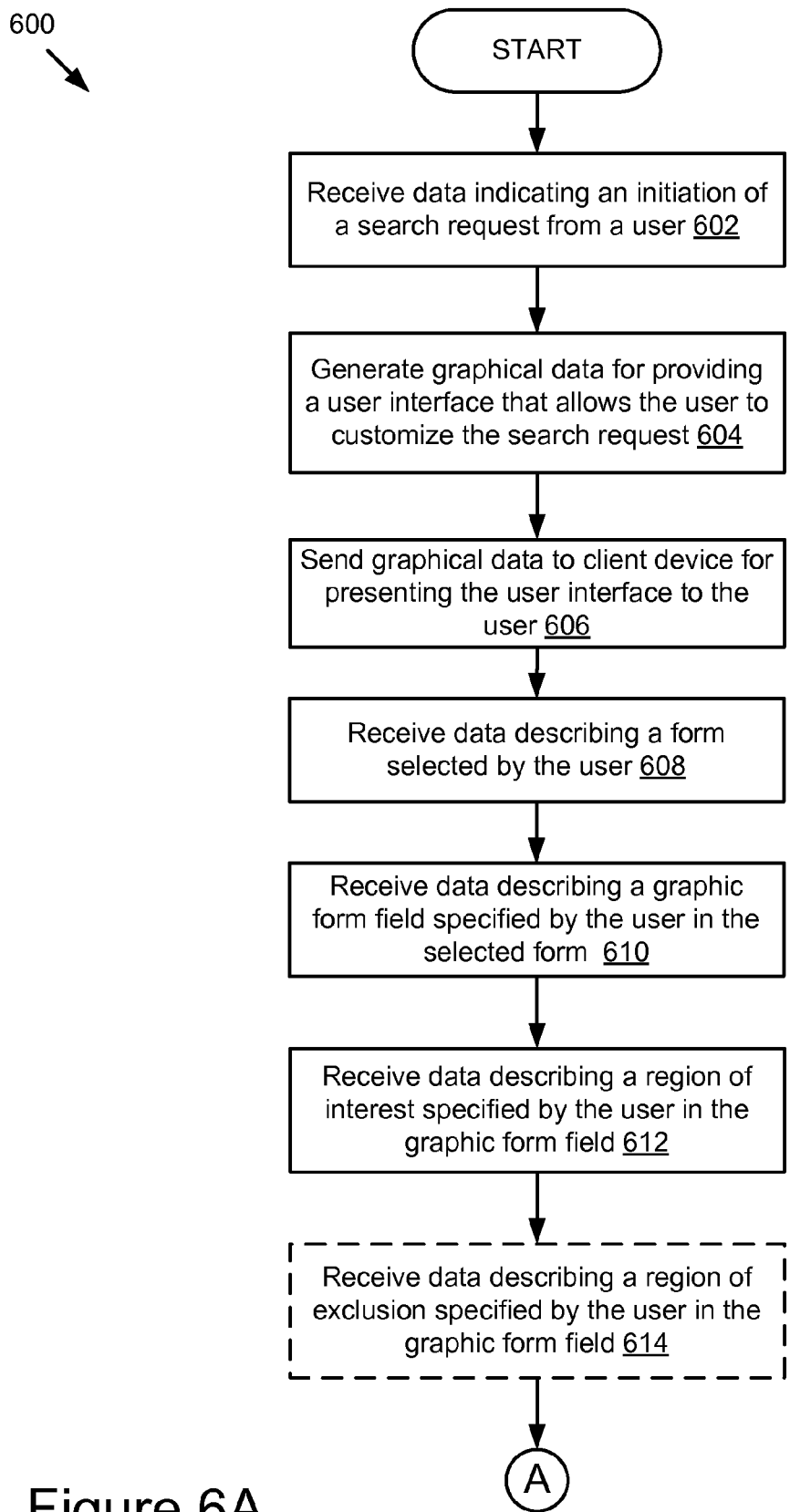
FIGS. 6A-6C are flow diagrams of another embodiment of a method for aggregating form data based on marks in graphic form fields.
Figure 6B:
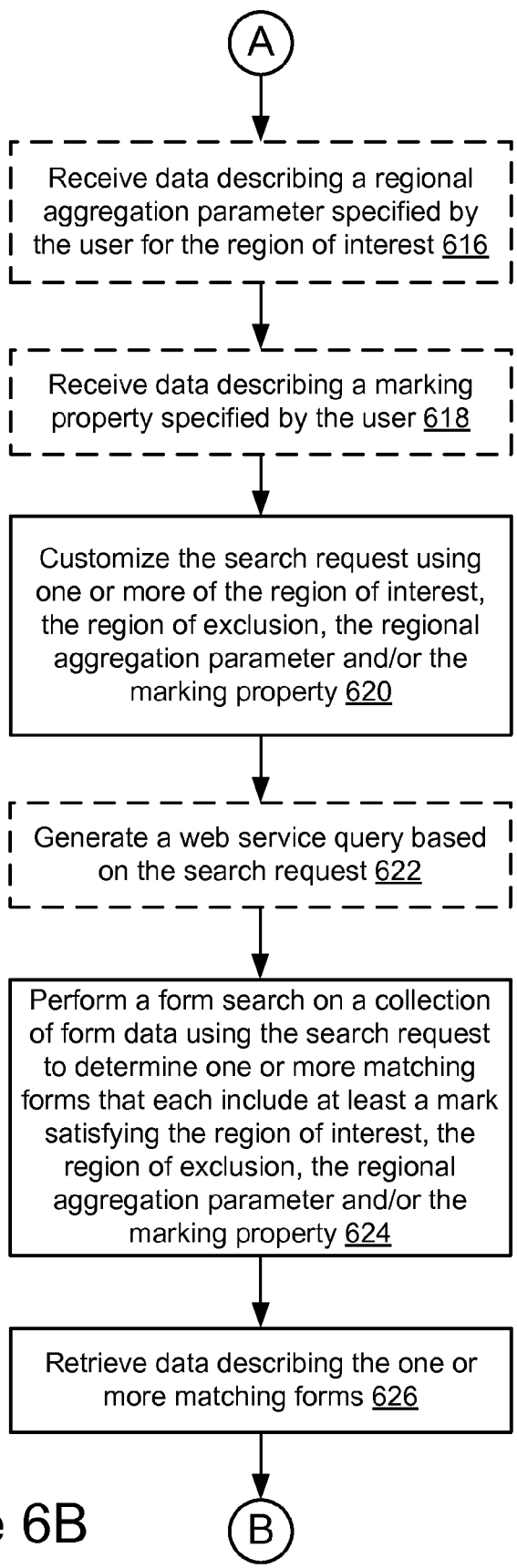
Figure 6C:
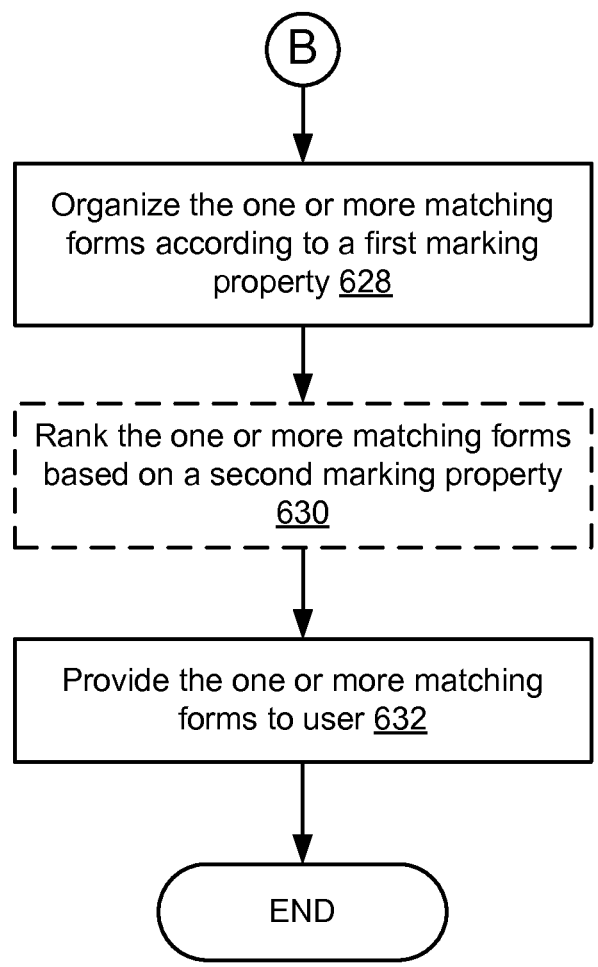

FIGS. 6A-6C are flow diagrams of another embodiment of a method 600 for aggregating form data based on marks in graphic form fields. The graphic form application 109 includes a controller 202, a request customization module 206, a search module 208, a management module 210, a presentation module 212 and a user interface module 214. Referring to FIG. 6A, the controller 202 receives 602 data indicating an initiation of a search request from a user. The user interface module 214 generates 604 graphical data for providing a user interface that allows the user to customize the search request. The controller 202 sends 606 the graphical data to a client device 115 for presenting the user interface to the user. The controller 202 receives 608 data describing a form selected by the user. The controller 202 receives 610 data describing a graphic form field specified by the user in the selected form. The controller 202 receives 612 data describing a region of interest specified by the user in the graphic form field. Optionally, the controller 202 receives 614 data describing a region of exclusion specified by the user in the graphic form field.

Referring to FIG. 6B, the controller 202 optionally receives 616 data describing a regional aggregation parameter specified by the user for the region of interest. The controller 202 optionally receives 618 data describing a marking property specified by the user. The request customization module 206 customizes 620 the search request using one or more of the region of interest, the region of exclusion, the regional aggregation parameter and/or the marking property specified by the user. Optionally, the request customization module 206 generates 622 a web service query based on the search request. The search module 208 performs 624 a form search on a collection of form data using the search request or the web service query to determine one or more matching forms that each include at least one mark satisfying one or more of the region of interest, the region of exclusion, the regional aggregation parameter and/or the marking property. The search module 208 retrieves 626 the data describing the one or more matching forms from the storage device 143.

Referring to FIG. 6C, the management module 210 organizes 628 the one or more matching forms according to a first marking property. Optionally, the management module 210 ranks 630 the one or more matching forms based on a second marking property. In one embodiment, the first marking property is different from the second marking property. In another embodiment, the first marking property is the same as the second marking property. The presentation module 212 provides 632 the one or more matching forms to the user.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:

receiving, with one or more computing devices, data indicating an initiation of a search request from a user;

receiving, with the one or more computing devices, data describing a form selected by the user;

receiving, with the one or more computing devices, data describing a graphic form field specified by the user in the form;

receiving, with the one or more computing devices, data describing a first mark specified by the user in the graphic form field;

receiving, with the one or more computing devices, a region of interest, associated with the first mark, specified by the user in the graphic form field, the region of interest defined by an x coordinate value indicating a first distance of the region of interest relative to a first coordinate of the graphic form field and a y coordinate value indicating a second distance of the region of interest relative to a second coordinate of the graphic form field;

receiving, with the one or more computing devices, data describing a regional aggregation parameter specified by the user for the region of interest, wherein the regional aggregation parameter defines a criteria for aggregating marks in the region of interest;

customizing, with the one or more computing devices, the search request using data describing the first mark in the graphic form field, the region of interest, and the regional aggregation parameter;

performing, with the one or more computing devices, a form search on a collection of form data using the search request to determine one or more matching forms that each include at least one mark satisfying the data describing the first mark and the regional aggregation parameter;

identifying, with the one or more computing devices, a first marking location associated with a second mark in a first matching form;

in response to determining that the first marking location is within a range of a first cluster, classifying, with the one or more computing devices, the first matching form into the first cluster; and providing, with the one or more computing devices, the first cluster to the user.

2. The method of claim 1, wherein the data describing the first mark comprises the region of interest.

3. The method of claim 2, further comprising:
receiving data describing a region of exclusion specified by the user in the graphic form field; and
wherein the search request is further customized based on the region of exclusion, and the at least one mark in each of the one or more matching forms satisfies the region of exclusion.

4. The method of claim 1, wherein the regional aggregation parameter defines the criteria for aggregation as one or more of: at least one mark in the region of interest, no marks in the region of interest, marks in the region of interest being completely contained within the region of interest, marks in the region of interest being partially overlapping with another region of interest.

5. The method of claim 1, further comprising:
organizing the one or more matching forms based on a marking property.

6. The method of claim 5, wherein organizing the one or more matching forms comprises clustering the one or more matching forms based on a marking location associated with the at least one mark in each of the one or more matching forms.

7. The method of claim 5, wherein the marking property includes one of a marking location, a marking style, a marking length, a marking contour and a count of marks.

8. A system comprising:
one or more processors;
a controller stored on a memory and executable by the one or more processors, the controller configured to receive data indicating an initiation of a search request from a user, data describing a form selected by the user, data describing a graphic form field specified by the user in the form, data describing a first mark specified by the user in the graphic form field, a region of interest, associated with the first mark, specified by the user in the graphic form field, the region of interest defined by an x coordinate value indicating a first distance of the region of interest relative to a first coordinate of the graphic form field and a y coordinate value indicating a second distance of the region of interest relative to a second coordinate of the graphic form field, and data describing a regional aggregation parameter specified by the user for the region of interest, wherein the regional aggregation parameter defines a criteria for aggregating marks in the region of interest;
a request customization module configured to customize the search request using the data describing the first mark in the graphic form field, the region of interest, and the regional aggregation parameter;

a search module configured to perform a form search on a collection of form data using the search request to determine one or more matching forms that each include at least one mark satisfying the data describing the first mark and the regional aggregation parameter;

a management module configured to identify a first marking location associated with a second mark in a first matching form and in response to determining that the first marking location is within a range of a first cluster, classify the first matching form into the first cluster; and a presentation module configured to provide the first cluster to the user.

9. The system of claim 8, wherein the data describing the first mark comprises the region of interest.

10. The system of claim 9, wherein
the controller is configured to receive data describing a region of exclusion specified by the user in the graphic form field; and
the search module is configured to customize the search request further based on the region of exclusion, wherein the at least one mark in each of the one or more matching forms satisfies the region of exclusion.

11. The system of claim 8, wherein
the regional aggregation parameter defines the criteria for aggregation as one or more of:
at least one mark in the region of interest, no marks in the region of interest, marks in the region of interest being completely contained within the region of interest, marks in the region of interest being partially overlapping with another region of interest.

12. The system of claim 8, further comprising:
a management module configured to organize the one or more matching forms based on a marking property.

13. The system of claim 12, wherein the management module is further configured to cluster the one or more matching forms based on a marking location associated with the at least one mark in each of the one or more matching forms.

14. The system of claim 12, wherein the marking property includes one of a marking location, a marking style, a marking length, a marking contour and a count of marks.

15. A computer program product comprising a non-transitory computer useable medium including a computer readable program, wherein the computer readable program when executed on a computer causes the computer to:
receive data indicating an initiation of a search request from a user;
receive data describing a form selected by the user;
receive data describing a graphic form field specified by the user in the form;
receive data describing a first mark specified by the user in the graphic form field;
receive a region of interest, associated with the first mark, specified by the user in the graphic form field, the region of interest defined by an x coordinate value indicating a first distance of the region of interest relative to a first coordinate of the graphic form field and a y coordinate value indicating a second distance of the region of interest relative to a second coordinate of the graphic form field;
receive data describing a regional aggregation parameter specified by the user for the region of interest, wherein the regional aggregation parameter defines a criteria for aggregating marks in the region of interest;

customize the search request using the data describing the first mark in the graphic form field, the region of interest and the regional aggregation parameter;

perform a form search on a collection of form data using the search request to determine one or more matching forms that each include at least one mark satisfying the data describing the first mark and the regional aggregation parameter;

identify a first marking location associated with a second mark in a first matching form;

in response to determining that the first marking location is within a range of a first cluster, classify the first matching form into the first cluster; and provide the first cluster to the user.

16. The computer program product of claim 15, wherein the data describing the first mark comprises the region of interest.

17. The computer program product of claim 16, wherein the computer readable program when executed on the computer causes the computer to also:

receive data describing a region of exclusion specified by the user in the graphic form field; and wherein the search request is further customized based on the region of exclusion, and the at least one mark in each of the one or more matching forms satisfies the region of exclusion.

18. The computer program product of claim 15, wherein the regional aggregation parameter defines the criteria for aggregation as one or more of: at least one mark in the region of interest, no marks in the region of interest, marks in the region of interest being completely contained within the region of interest, marks in the region of interest being partially overlapping with another region of interest.

19. The computer program product of claim 15, wherein the computer readable program when executed on the computer causes the computer to also:

organize the one or more matching forms based on a marking property.

20. The computer program product of claim 19, wherein organizing the one or more matching forms comprises clustering the one or more matching forms based on a marking location associated with the at least one mark in each of the one or more matching forms.

* * * * *